United States Patent
Huynh

(10) Patent No.: US 7,817,447 B2
(45) Date of Patent: Oct. 19, 2010

(54) ACCURATE VOLTAGE REGULATION OF A PRIMARY-SIDE REGULATION POWER SUPPLY IN CONTINUOUS CONDUCTION MODE OPERATION

(75) Inventor: Steven Huynh, Sunnyvale, CA (US)

(73) Assignee: Active-Semi, Inc. (VG)

( * ) Notice: Subject to any disclaimer, the term of this patent is extended or adjusted under 35 U.S.C. 154(b) by 298 days.

(21) Appl. No.: 12/231,202

(22) Filed: Aug. 30, 2008

(65) Prior Publication Data

US 2010/0054000 A1   Mar. 4, 2010

(51) Int. Cl.
*H02M 3/335*    (2006.01)
(52) U.S. Cl. ............... 363/21.12; 363/21.16; 363/21.18
(58) Field of Classification Search ........... 363/20, 363/21.01, 21.12, 21.16, 21.18
See application file for complete search history.

(56) References Cited

U.S. PATENT DOCUMENTS

| | | | | |
|---|---|---|---|---|
| 5,745,358 A | * | 4/1998 | Faulk | 363/95 |
| 5,841,641 A | * | 11/1998 | Faulk | 363/21.14 |
| 6,101,105 A | * | 8/2000 | Gilmore | 363/21.15 |
| 7,027,313 B2 | * | 4/2006 | Amei | 363/21.12 |
| 7,239,532 B1 | * | 7/2007 | Hsu et al. | 363/21.12 |
| 7,593,245 B2 | * | 9/2009 | Djenguerian et al. | 363/95 |
| 7,635,956 B2 | * | 12/2009 | Huynh et al. | 315/291 |
| 7,667,987 B2 | * | 2/2010 | Huynh et al. | 363/21.12 |
| 7,679,936 B2 | * | 3/2010 | Huynh et al. | 363/16 |

* cited by examiner

*Primary Examiner*—Bao Q Vu
(74) *Attorney, Agent, or Firm*—Imperium Patent Works; Zheng Jin

(57) ABSTRACT

A power converter operates in continuous conduction mode and outputs a regulated output voltage. A feedback-derived signal is used to regulate the output voltage. The feedback-derived signal is sampled at multiple time points during an OFF cycle of a power switch. A current-sense signal is also sampled at one or more time points during an ON cycle of the power switch. The current-sense signal is indicative of an output inductor current of the power converter. A calibrated feedback-derived voltage is then generated based on the multiple voltage samples of the feedback-derived signal and the one or more voltage samples of the current-sense signal. The calibrated feedback-derived voltage is less sensitive to an output inductor current loop resistance than the original voltage samples of the feedback-derived signal. The calibrated feedback-derived voltage also compensates for the nonlinearity of a diode of the output inductor current loop.

26 Claims, 8 Drawing Sheets

PSR DISCONTINUOUS CONDUCTION MODE OPERATION

ACCURATE VOLTAGE REGULATION OF A PRIMARY-SIDE REGULATION POWER SUPPLY IN CONTINUOUS CONDUCTION MODE OPERATION

TECHNICAL FIELD

The present invention relates generally to the field of power conversion and, more particularly, to switch mode power supply circuits that regulate output current and voltage.

BACKGROUND

Switching regulators are voltage regulators incorporated by many switch-mode power supply (SMPS) applications. Typically, a switching regulator uses a power switch, an inductor, and a diode to transfer energy from input to output. A pulse-width-modulation (PWM) digital control signal is used in the switching regulator to generate a regulated output voltage. Among different types of switching regulators, a flyback converter is a versatile regulator with an inductor split to form a transformer which provides an additional advantage of input to output isolation.

FIG. 1 (prior art) illustrates an exemplary conventional primary-side regulation (PSR) flyback converter 10. Converter 10 includes a transformer 11, an external NPN bipolar transistor 15 and a controller integrated circuit (IC) 16. Transformer 11 has three windings: a primary-side winding 12, a secondary-side winding 13, and an auxiliary winding 14. Controller IC 16 includes a pre-amplifier 21, a sampler 22, a pulse-width-modulation (PWM) error amplifier 23, an error comparator 24, an oscillator & tramp detector 25, PWM control logic 26, a gate driver 27, a current-sense amplifier 28, a MOSFET 29, an internal main power switch 30, and a current-sense resistor 31.

When main power switch 30 is turned on, an input voltage $V_{IN}$ is forced across the primary inductor 12 and an inductor current 17 ramps up through primary inductor 12. A magnetic field is generated that transfers energy to secondary winding 13 when main power switch 30 is turned off. The energy transferred to the secondary winding 13 is output from converter 10 as a secondary inductor current $I_{SEC}$ with an output voltage $V_{OUT}$. The voltage $V_{AUX}$ on auxiliary winding 14, an indication of the output voltage $V_{OUT}$, is fed back via auxiliary winding 14 and feedback terminal FB 18 to controller IC 16. Inside controller IC 16, auxiliary feedback signal 41 ($V_{FB}$) is amplified against a reference voltage $V_{REF}$ by pre-amplifier 21 to produce a feedback error signal 42 ($V_{ERROR}$). $V_{ERROR}$ is sampled by sampler 22 and is further amplified by PWM error amplifier 23. Error comparator 24 receives error amplifier output signal 43 and current-sense signal 44 and outputs a regulation signal 45. Regulation signal 45 is used to set the on-time of main power switch 30 through PWM control logic 26. The output voltage $V_{OUT}$ is thus regulated through such feedback and control mechanism.

Because of the feedback and control mechanism, PSR flyback converter 10 relies on feedback error signal $V_{ERROR}$ to regulate the output voltage $V_{OUT}$. Feedback error signal $V_{ERROR}$, however, is sensitive to the $I_{SEC} \cdot R_{SEC}$ voltage drop resulting from the secondary inductor current loop total parasitic resistance $R_{SEC}$. The output voltage $V_{OUT}$ therefore cannot be accurately regulated without compensating for such $I_{SEC} \cdot R_{SEC}$ voltage drop. This is especially true when PSR flyback converter 10 operates in a continuous conduction mode (CCM) because the secondary inductor current $I_{SEC}$ varies widely in CCM operation. A method is sought for compensating the secondary inductor current loop resistance $R_{SEC}$ in order to more accurately regulate the output voltage $V_{OUT}$ of a switching regulator that operates in CCM.

SUMMARY

A power converter converts an input voltage to a regulated output voltage. When the power converter operates in constant voltage mode, a feedback-derived signal is used to regulate the output voltage. In one example, the feedback derived signal is a feedback error signal proportional to the difference between a feedback voltage and a reference voltage. An error sampler samples the feedback error signal at multiple time points during an OFF cycle of a power switch of the power converter and generates multiple original voltage samples of the feedback error signal. A current-sense sampler samples a current-sense signal at multiple time points during an ON cycle of the power switch and generates multiple voltage samples of the current-sense signal. The current-sense signal is indicative of an output inductor current of the power converter. A calibrated feedback error voltage is then generated based on the multiple original voltage samples of the feedback error signal and the multiple voltage samples of the current-sense signal. The calibrated feedback error voltage is less sensitive to an output inductor current loop resistance than the original voltage samples of the feedback error signal. The calibrated feedback error voltage also compensates for the nonlinearity of a rectifier diode of the output inductor current loop.

In one embodiment, the power converter is a primary-side regulation (PSR) flyback converter that operates in continuous conduction mode (CCM). In CCM operation, the output inductor current does not decay to zero during the OFF cycle. The calibrated feedback error voltage is thus calculated to compensate for the voltage drop caused by the output inductor current loop resistance. In one example, the calibrated feedback error voltage is generated via piecewise linear approximation based on the multiple original voltage samples of the feedback error signal and the multiple voltage samples of the current-sense signal to correspond to an effective feedback error voltage when the output inductor current drops to zero. In another example, the piecewise linear approximation of the calibrated feedback error signal is further adjusted by a predetermined constant in order to compensate for the nonlinearity of the rectifier diode.

In one embodiment of the PSR flyback converter, the error sampler is a sample and hold circuit formed by a plurality of sampling capacitors and switches. The feedback error signal is sampled at a high sampling frequency provided by a sampling clock during each OFF cycle of the power switch. In each sampling cycle, the sampling starts at a first time period after the power switch is switched OFF, and the sampling stops when the power switch is switched ON or when the secondary winding completely demagnetizes. A final voltage sample of the feedback error signal is obtained at a second time period before the power switch is switched ON and before the secondary winding completely demagnetizes. The first time period of each sampling cycle is adjusted based on the second time period such that an average of the final voltage sample of the feedback error signal is independent from the second time period.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
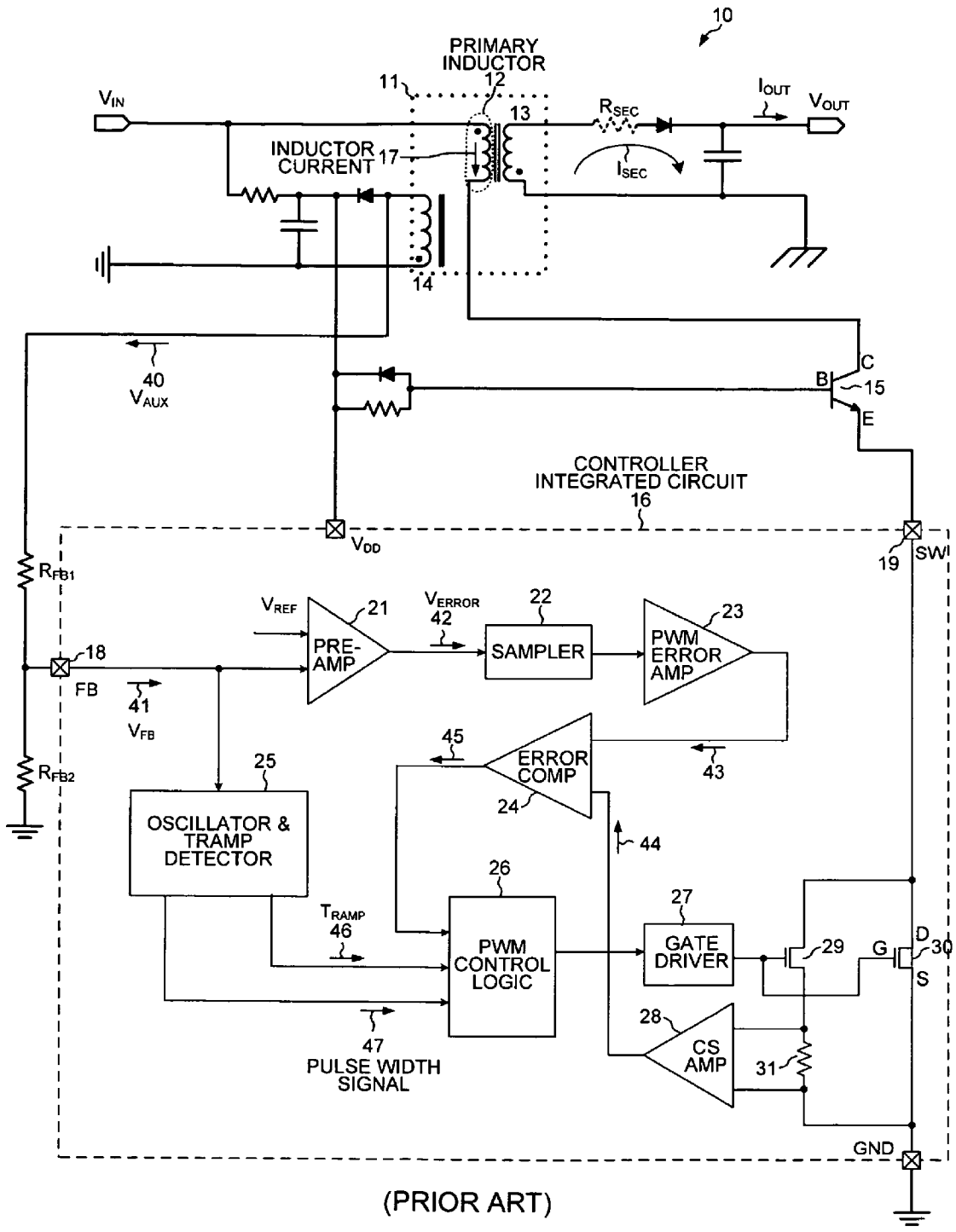
FIG. 1 (prior art) is a simplified schematic diagram of a conventional primary-side regulation (PSR) flyback converter.
Figure 2:
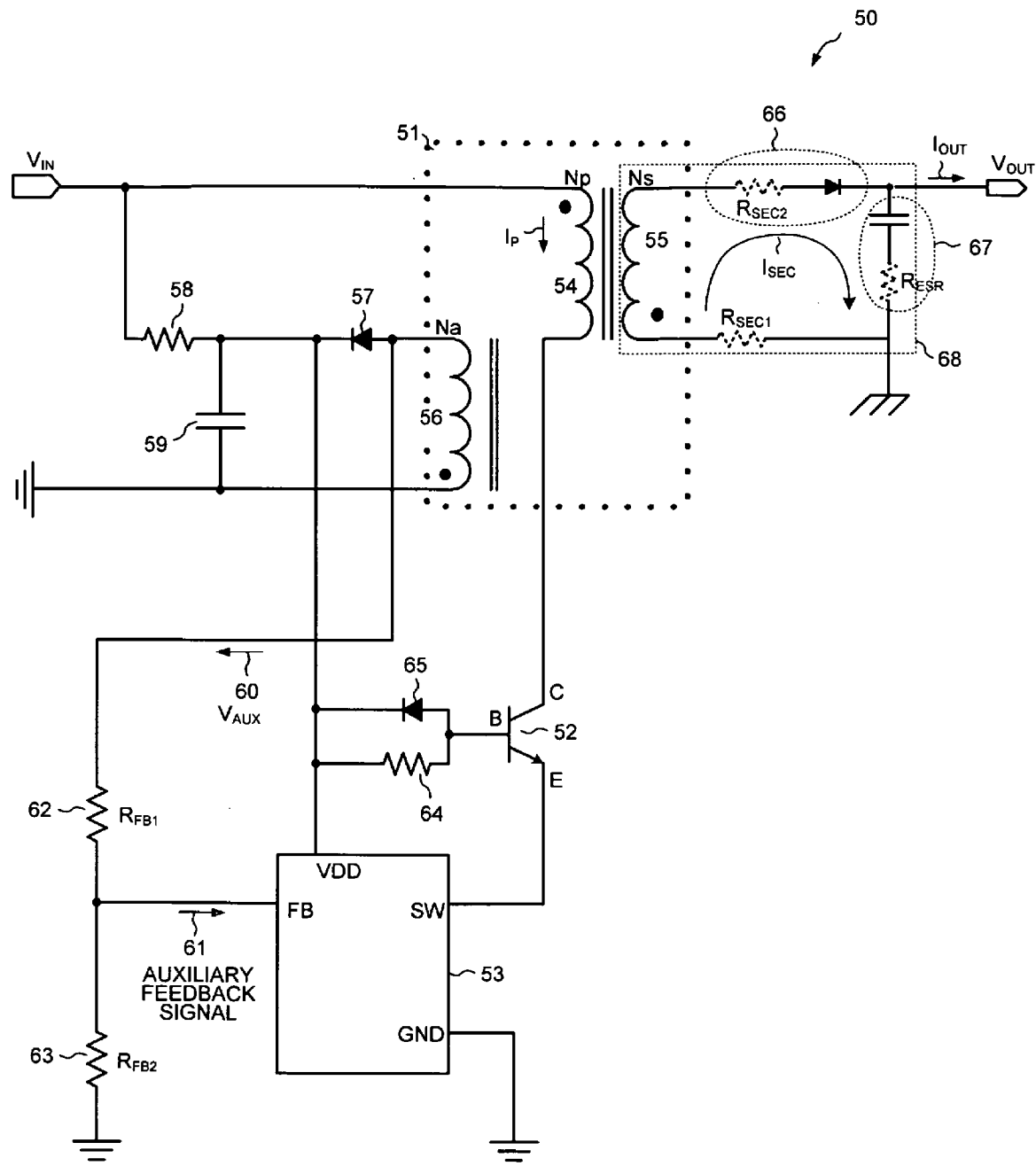
FIG. 2 is a high level schematic diagram of a primary-side regulation (PSR) flyback converter in accordance with one novel aspect.

FIG. 2 is a high level schematic diagram of a primary-side regulation (PSR) constant current/constant voltage (CC/CV) flyback converter 50 in accordance with one novel aspect. PSR flyback converter 50 includes a transformer 51, an external NPN bipolar transistor 52 and a controller integrated circuit (IC) 53. Transformer 51 includes a primary winding (inductor $L_P$) 54 having $N_P$ turns, a secondary winding (inductor $L_S$) 55 having $N_S$ turns, and an auxiliary winding (inductor $L_A$) 56 having $N_A$ turns. Controller IC 53 is a pulse-width-modulation (PWM) controller having four terminals: terminal VDD for supply voltage, terminal GND for ground, terminal SW for switching, and terminal FB for feedback. The initial start-up energy for controller IC 53 is provided by a resistor 58 and a capacitor 59. Once PSR flyback converter 50 is stable, auxiliary winding 56 of transformer 51 powers controller IC 53 via a rectifier 57. PSR flyback converter 50 converts an input voltage $V_{IN}$ to a regulated output voltage $V_{OUT}$.

The output voltage $V_{OUT}$ is regulated by a feedback and control mechanism. As illustrated in FIG. 2, the only feedback from the secondary side is feedback from the magnetic coupling of auxiliary winding 56 and secondary winding 55. Auxiliary feedback signal 61 ($V_{FB}$) on feedback terminal FB is obtained by passing a voltage 60 ($V_{AUX}$) on a node of auxiliary winding 56 through a voltage divider feedback circuit that includes a first feedback resistor 62 and a second feedback resistor 63. Feedback signal $V_{FB}$ is therefore a feedback-derived signal that is indicative of the output voltage $V_{OUT}$. Controller IC 53 receives the feedback signal $V_{FB}$ from terminal FB and in response generates a desired PWM digital control signal onto terminal SW to regulate the output voltage $V_{OUT}$ of PSR flyback converter 50.

Figure 3:
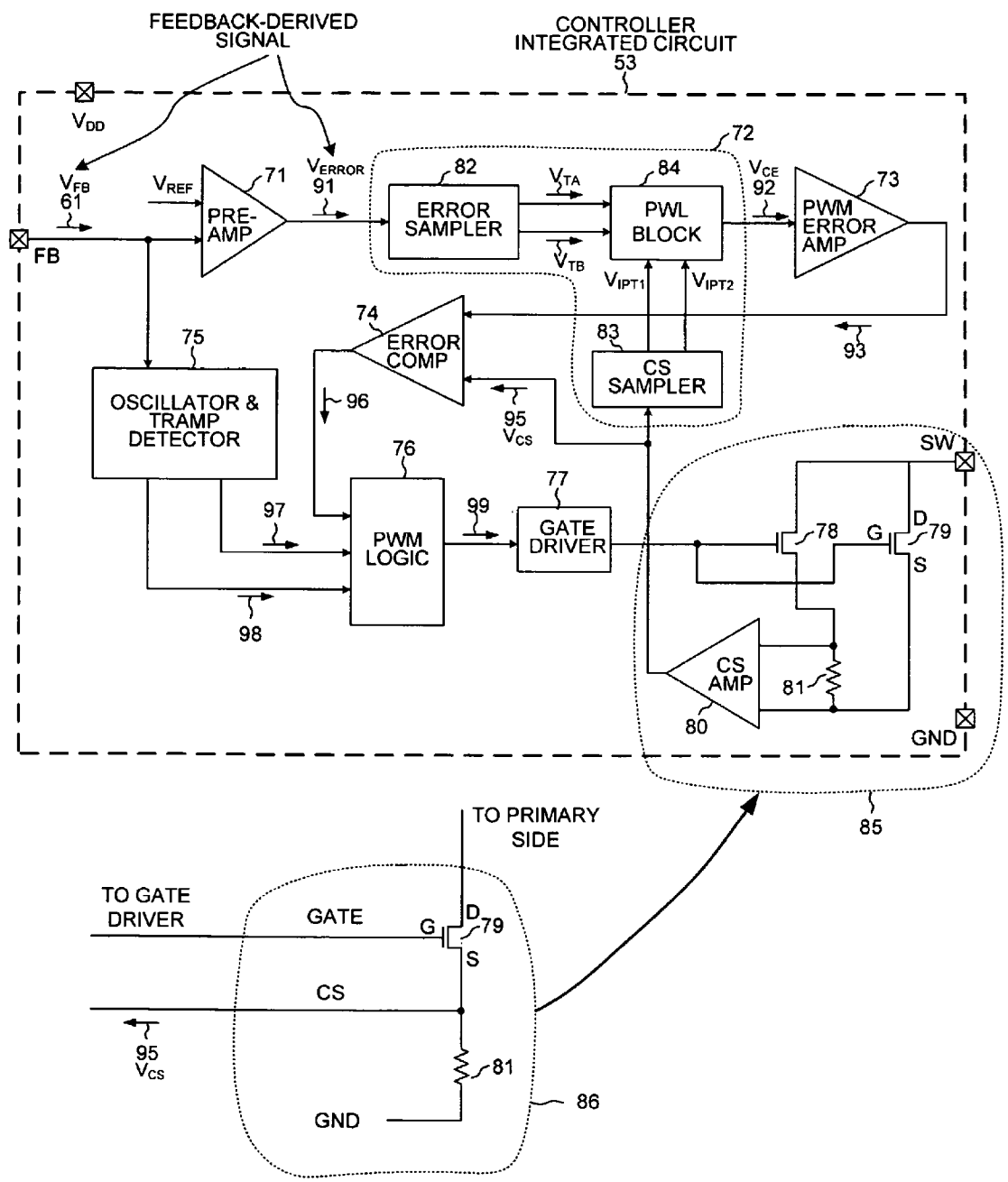
FIG. 3 is a block diagram of a controller integrated circuit (IC) of a PSR flyback converter in accordance with one novel aspect.
Figure 4:
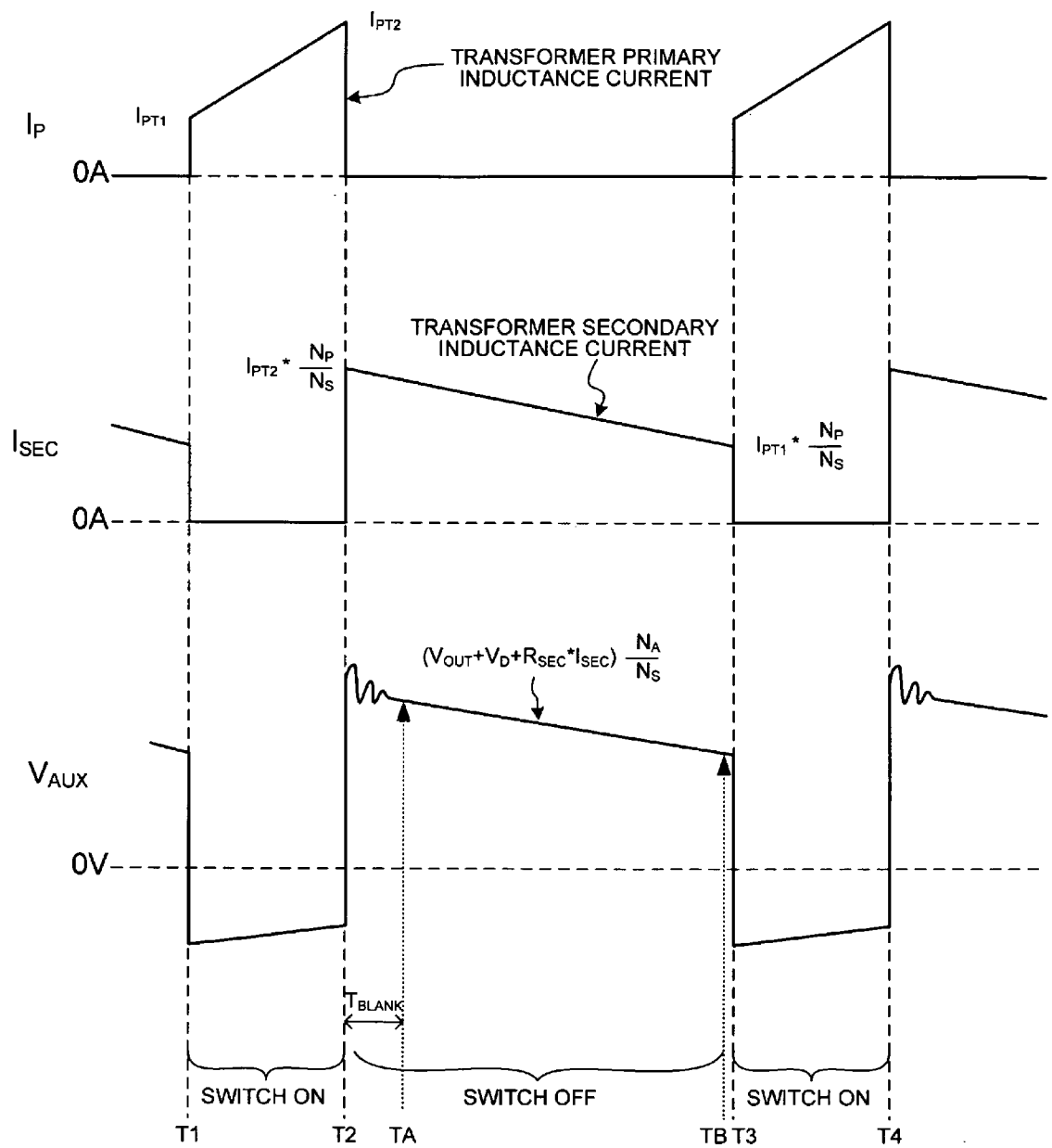
FIG. 4 is a waveform diagram of a PSR flyback converter in continuous conduction mode (CCM) operation.

FIG. 3 is a block diagram of controller IC 53 of PSR flyback converter 50 in accordance with one novel aspect. Controller IC 53 includes a pre-amplifier 71, a multi-sample error function circuit 72, a PWM error amplifier 73, an error comparator 74, an oscillator and tramp detector 75, PWM logic 76, a gate driver 77, a MOSFET 78, an internal main power switch 79, a current-sense amplifier 80, and a current-sense resistor 81. Multi-sample error function circuit 72 includes an error sampler 82, a current-sense sampler 83, and an error function block (for example, a piecewise linear (PWL) block as illustrated in FIG. 4) 84. With details explained later, multi-sample error function circuit 72 is used for calibrating a feedback error signal $V_{ERROR}$ to improve accuracy of PSR flyback converter 50.

During the operation of controller IC 53, a regulation signal 96, a switching frequency signal 97, and a pulse width signal 98 is provided to PWM logic 76. PWM logic 76 in turn outputs a PWM square wave digital control signal 99 to control the ON and OFF states of internal main power switch 79. When main power switch 79 is switched ON (ON cycle), input voltage $V_{IN}$ is forced across the primary inductor 54. A primary inductor current $I_P$ starts flowing through primary inductor 54. As primary inductor current $I_P$ ramps up, a magnetic field is generated that transfers energy to secondary inductor 55 when main power switch 79 is switched OFF (OFF cycle). The energy transferred to secondary inductor 55 is output from PSR flyback converter 50 as a secondary inductor current $I_{SEC}$ with the output voltage $V_{OUT}$. The secondary inductor current $I_{SEC}$ flows through a secondary inductor current loop 68 having a secondary inductor current loop total parasitic resistance $R_{SEC}$. By adjusting the duty cycle of the PWM control signal 99, the output voltage $V_{OUT}$ can be regulated at a desired voltage level.

In a constant-voltage mode of operation, regulation signal 96 is used to set the on-time of main power switch 79 through a feedback mechanism. From feedback terminal FB, feedback-derived signal (auxiliary feedback signal) $V_{FB}$ is received by pre-amplifier 71. Preamplifier 71 amplifies the voltage difference between the feedback signal $V_{FB}$ and a reference voltage $V_{REF}$, and outputs a feedback error signal 91 ($V_{ERROR}$). Feedback error signal $V_{ERROR}$ is therefore also a feedback-derived signal that is indicative of the output voltage $V_{OUT}$. In the example of FIG. 3, feedback-derived signal $V_{ERROR}$ (alternatively, feedback-derived signal $V_{FB}$) is sampled and calibrated by multi-sample error function circuit 72. Multi-sample error function circuit 72 outputs a calibrated feedback error voltage 92 ($V_{CE}$). PWM error amplifier 73 further amplifies and integrates the calibrated feedback error voltage $V_{CE}$ and outputs an error amplifier output signal 93. From switching terminal SW, a current is sensed by a current-sense circuit formed by MOSFET 78 and current-sense resistor 81. The sensed current is indicative of the primary inductor current $I_P$ during ON cycle. Current-sense amplifier 80 amplifies the sensed current and outputs a current-sense signal 95 ($V_{CS}$). Error comparator 74 compares error amplifier output signal 93 and current-sense signal 95 and in response outputs regulation signal 96. Based on regulation signal 96, PWM logic 76 sets the on-time of main power switch 79 to regulate the output voltage $V_{OUT}$.

As illustrated in FIG. 3, in an alternative implementation of flyback converter 50, the dashed portion 85 is replaced by another dashed portion 86. In the alternative implementation, the current-sense signal 95 ($V_{CS}$) is obtained by tapping the current-sense resistor 81 directly without going through a current-sense amplifier. In addition, either of the main power switch 79 or the current-sense resistor 81 may be internal or external to controller IC 53. Under any of these embodiments, $V_{CS}$ is used to represent the primary inductor current $I_P$ during ON cycle.

Flyback converter 50 outputs a constant voltage in two operational modes: a discontinuous conduction mode (DCM) and a continuous conduction mode (CCM). In DCM operation, the secondary inductor current $I_{SEC}$ ramps down to zero during OFF cycle. In CCM operation, on the other hand, an inductor with a large inductance is used such that $I_{SEC}$ never drops to zero during OFF cycle. Flyback converter 50 can transition back and forth between CCM and DCM depending on load current level and line voltage. When high load current and low line voltage forces main power switch 79 to operate at a high duty cycle exceeding the critical conduction condition, flyback converter 50 operates in CCM to maintain regulation. When the line voltage increases or when the load current decreases, flyback converter 50 transitions to DCM to sustain regulation.

FIG. 4 is a waveform diagram of flyback converter 50 in continuous conduction mode (CCM) operation. The waveform labeled $I_P$ represents the primary inductor current $I_P$ flowing through primary winding 54. The waveform labeled $I_{SEC}$ represents the secondary inductor current $I_{SEC}$ flowing through secondary winding 55. Main power switch 79 turns ON at T1, turns OFF at T2, and turns ON again at T3. Thus, the time between T1 and T3 is the switching period. The time between T1 and T2 is the SWITCH ON time during which main power switch 79 is turned on (ON cycle). The time between T2 and T3 is the SWITCH OFF time during which main power switch 79 is turned off (OFF cycle). As illustrated in FIG. 4, the primary inductor current $I_P$ ramps up during ON cycle. The primary inductor current $I_P$ is equal to $I_{PT1}$ at time T1 and is equal to $I_{PT2}$ at time T2, when $I_P$ reaches its peak current. During OFF cycle, the primary inductor current $I_P$ drops to zero and energy is transferred from the primary winding 54 to the secondary winding 55. The secondary inductor current $I_{SEC}$ starts to flow and gradually ramps down. Because transformer 51 does not add power, it follows that the power (V*I) on either primary or secondary side must be constant. As a result, the secondary inductor current $I_{SEC}$ is equal to $I_{PT2} \cdot (N_P/N_S)$ at time T2 and is equal to $I_{PT1} \cdot (N_P/N_S)$ at time T3 (time T3 for one cycle is equivalent to time T1 for a previous cycle), when another ON cycle starts. In CCM operation, the secondary inductor current $I_{SEC}$ ramps down from time T2 to T3 but never drops to zero.

FIG. 4 also illustrates the waveform labeled $V_{AUX}$ representing the voltage $V_{AUX}$ on auxiliary winding 56. The output voltage $V_{OUT}$ of PSR flyback converter 50 is related to the voltage $V_{AUX}$ on auxiliary winding 56 during OFF cycle because of the magnetic coupling of auxiliary winding 56 and secondary winding 55. As secondary inductor current $I_{SEC}$ flows through the secondary inductor current loop 68, the relationship between $V_{OUT}$ and $V_{AUX}$ can be approximately expressed by Equation 1 below:

$$V_{AUX}(t) = [V_{OUT}(t) + V_D(t) + R_{SEC} \cdot I_{SEC}(t)] \cdot N_A/N_S \quad \text{(Equ. 1)}$$

where $V_D(t)$ is the secondary-side diode rectifier diode voltage drop, $I_{SEC}(t)$ is the secondary inductor current, and $R_{SEC}$ is the secondary inductor current loop resistance. As illustrated in FIG. 4, $V_{AUX}$ stabilizes at time TA, a time period $T_{BLANK}$ after time T2, and reaches its lowest voltage at time TB (just before time T3 in CCM when another OFF cycle starts).

Equation 1 shows that although the voltage $V_{AUX}$ on auxiliary winding 56 provides a feedback for the output voltage $V_{OUT}$, $V_{AUX}$ is sensitive to the voltage drop caused by the secondary inductor current loop resistance $R_{SEC}$. Such sensitivity is more prominent when PSR flyback converter 50 operates in CCM because the secondary inductor current $I_{SEC}$ remains above zero during OFF cycle in CCM operation. Therefore, one factor that affects the accuracy of regulating the output voltage $V_{OUT}$ is the accuracy in compensating for the voltage drop caused by the secondary inductor current loop resistance $R_{SEC}$.

Because feedback error signal $V_{ERROR}$ represents and is proportional to $(V_{FB} - V_{REF})$, feedback error signal $V_{ERROR}$ can be calibrated to compensate for the secondary inductor current loop resistance $R_{SEC}$. Ideally, a calibrated feedback error voltage $V_{CE}$ of $V_{ERROR}$ is equivalent to a feedback error voltage when the secondary inductor current $I_{SEC}$ is approximately zero, at which time the voltage drop caused by the secondary inductor current loop total parasitic resistance $R_{SEC}$ is also approximately zero.

From Equation 1, assuming that $V_{OUT}(t)$ and $V_D(t)$ stay constant, then $V_{AUX}$ is approximately a linear line from time TA to time TB. The secondary inductor current loop resistance $R_{SEC}$ can be approximately expressed as Equation 2 below:

$$R_{SEC} \approx (\Delta V_{AUX}/\Delta I_{SEC}) \cdot N_S/N_A \quad \text{(Equ. 2)}$$

where $\Delta V_{AUX}$ is the voltage difference of $V_{AUX}$ between two time points, and $\Delta I_{SEC}$ is the current difference of $I_{SEC}$ between the same two time points. From Equation 2, assuming that $R_{SEC}$ stays constant, then $\Delta V_{AUX}/\Delta I_{SEC}$ remains constant under a piecewise linear approximation to auxiliary voltage $V_{AUX}$.

Because feedback error signal $V_{ERROR}$ is proportional to $(V_{FB} - V_{REF})$ and the primary inductor current $I_P$ is also proportional to $I_{SEC}$, it follows that $\Delta V_{ERROR}/\Delta I_P$ also remains constant under a piecewise linear approximation to feedback error signal $V_{ERROR}$. Therefore, $$(V_{TA} - V_{TB})/(V_{TB} - V_{CE}) = (I_{PT2} - I_{PT1})/(I_{PT1} - 0) \quad \text{(Equ. 3)}$$

where $V_{TA}$ and $V_{TB}$ are the voltage values of feedback error signal $V_{ERROR}$ at time TA and TB, $I_{PT1}$ and $I_{PT2}$ are the current values of $I_P$ at time T1 and T2, and $V_{CE}$ is the calibrated feedback error voltage when the secondary inductor current $I_{SEC}$ is approximately zero. According to Equation 3, $V_{CE}$ can be expressed as:

$$V_{CE} = V_{TB} - [(V_{TA} - V_{TB})/(I_{PT2} - I_{PT1})] \cdot I_{PT1} \quad \text{(Equ. 4)}$$

or $$V_{CE} = V_{TB} - [(V_{TA} - V_{TB})/(V_{IPT2} - V_{IPT1})] \cdot V_{IPT1} \quad \text{(Equ. 5)}$$

where $V_{IPT1}$ and $V_{IPT2}$ are the voltage values proportional to the current values of the primary inductor current $I_P$ at time T1 and T2. The term $[(V_{TA} - V_{TB})/(V_{IPT2} - V_{IPT1})]$ is an effective trans-resistance calibration factor that approximates the total parasitic secondary-side inductor current loop resistance $R_{SEC}$ as converted to the voltage samples. In CCM operation, when output current $I_{OUT}$ increases, the $V_{TB}$ voltage tends to increase by an amount proportional to the increase in $V_{IPT1}$. As a result, the calibrated feedback error voltage $V_{CE}$ is calibrated by reducing $V_{TB}$ by a term equal to the effective trans-resistance calibration factor multiplied by $V_{IPT1}$. By using the calibrated feedback error voltage $V_{CE}$ from Equation 5, the accuracy of PSR flyback converter 50 is improved.

Figure 5:
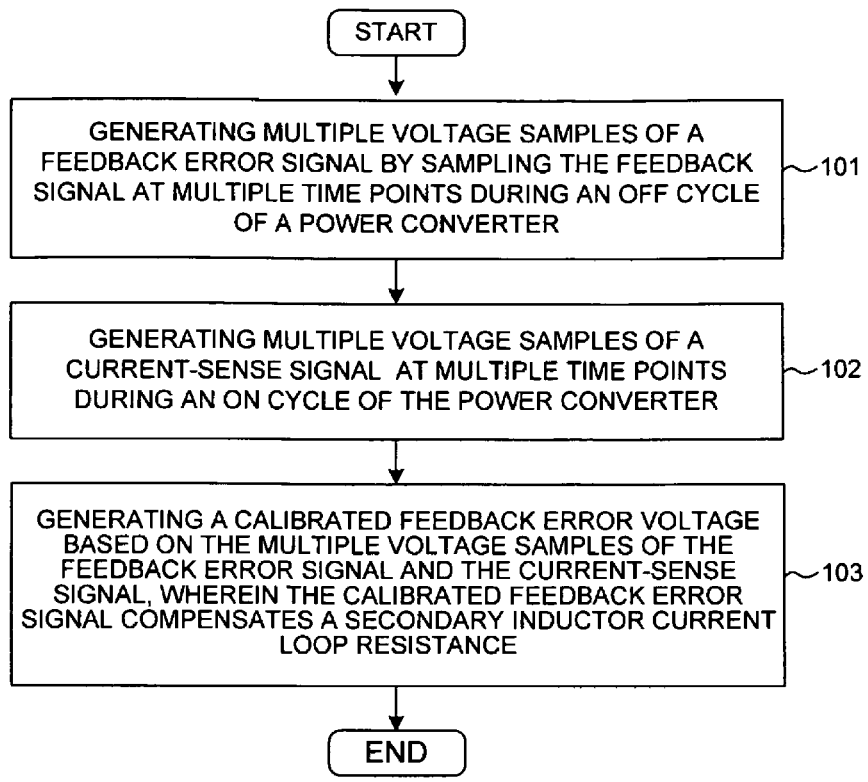
FIG. 5 is a flow chart of calibrating a feedback error signal of a PSR flyback converter in accordance with one novel aspect.

FIG. 5 is a flow chart of calibrating feedback error signal 91 ($V_{ERROR}$) of flyback converter 50 in accordance with one novel aspect. In a first step (step 101), feedback error signal $V_{ERROR}$ is sampled by error sampler 82 at time TA and TB. Error sampler 82 outputs a voltage sample $V_{TA}$ at time TA and a voltage sample $V_{TB}$ at time TB of the feedback error signal $V_{ERROR}$. In a second step (step 102), current-sense signal 95

($V_{CS}$) is sampled by current-sense sampler 83 at time T1 and T2. Current-sense sampler 83 outputs a voltage sample $V_{IPT1}$ at time T1 and a voltage sample $V_{IPT2}$ at time T2. Voltage samples $V_{IPT1}$ and $V_{IPT2}$ are proportional to the primary inductor current $I_P$ at time T1 and T2 respectively. In a third step (step 103), voltages samples $V_{T4}$, $V_{TB}$, $V_{IPT1}$ and $V_{IPT2}$ are received by error function block 84. In response, Error function block 84 generates a calibrated feedback error voltage 92 ($V_{CE}$). The sampling of $V_{ERROR}$ and $V_{CS}$ is explained in more detail below with respect to FIGS. 6-8.

Figure 6:
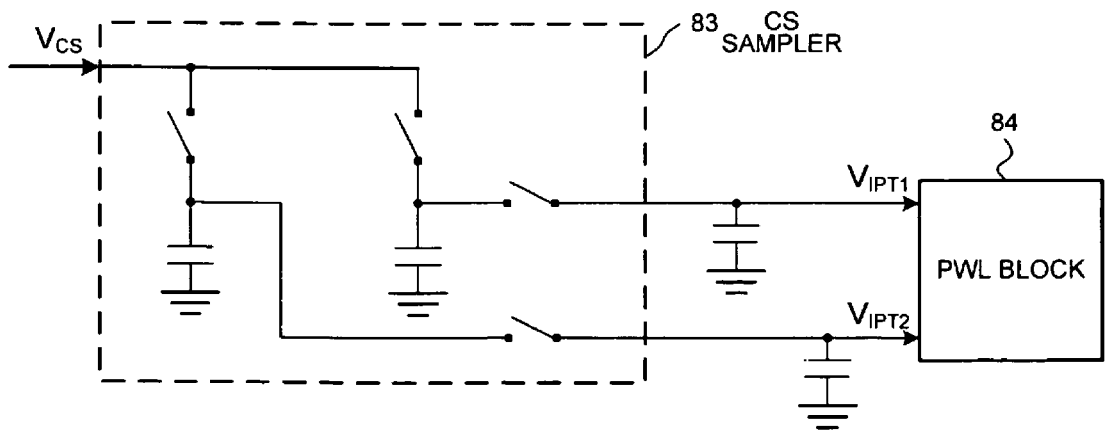
FIG. 6 is a block diagram of a current-sense sample and hold circuit.

FIG. 6 is a block diagram of current-sense sampler 83 of FIG. 3. In the example of FIG. 6, current-sense sampler 83 is a sample and hold circuit formed by a plurality of capacitors and switches. The capacitors are used to store the current-sense signal $V_{CS}$, and the switches are used to alternately connect or disconnect the capacitors from the current-sense signal $V_{CS}$. In order to obtain the desired voltage samples $V_{IPT1}$ and $V_{IPT2}$ of the current-sense signal $V_{CS}$ as required by Equation 5, current-sense signal $V_{CS}$ is sampled during ON cycle at time T1 and T2. By properly controlling the open and close time of the switches, voltage samples $V_{IPT1}$ and $V_{IPT2}$ are obtained at time T1 and T2 as desired.

Figure 7:
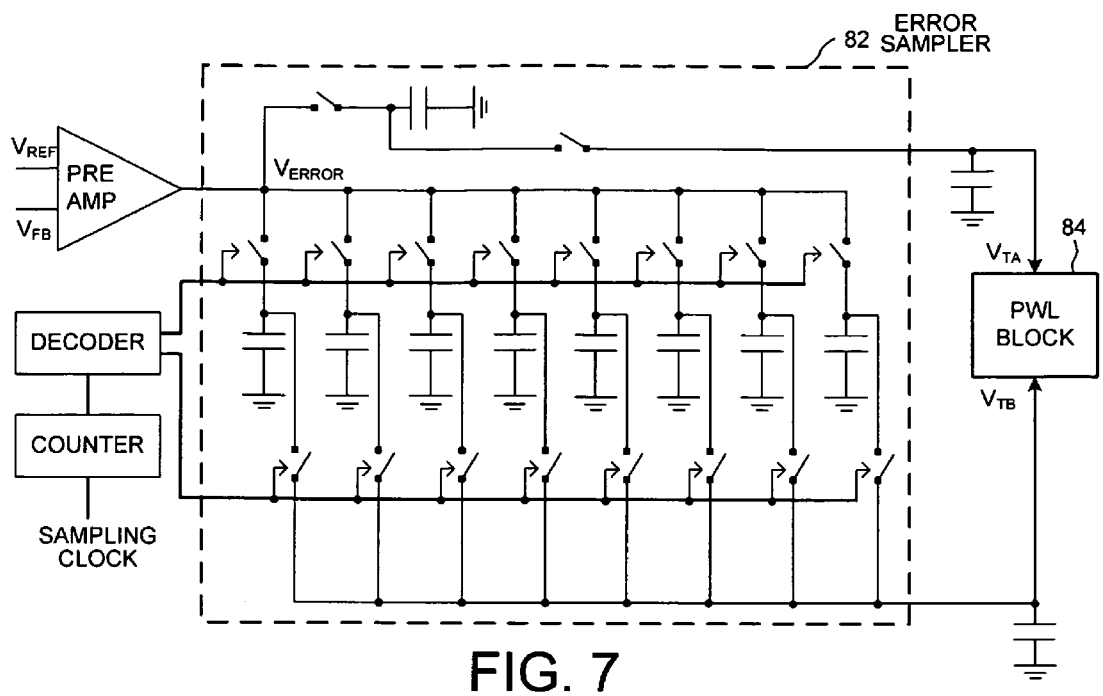
FIG. 7 is a block diagram of an error sample and hold circuit.
Figure 8:
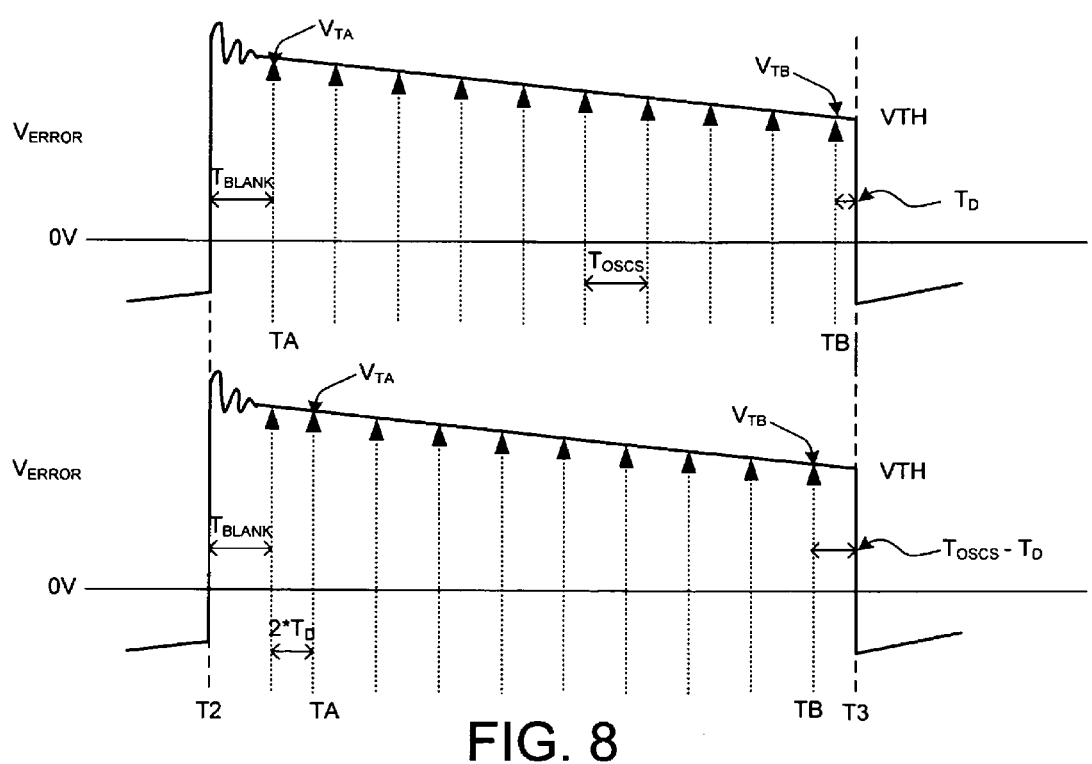
FIG. 8 is a diagram that illustrates sampling cycles of a feedback error signal.

FIG. 7 is a block diagram of error sampler 82 of FIG. 3. Error sampler 82 is also a sample and hold circuit formed by a plurality of capacitors and switches. In the example of FIG. 7, however, feedback error signal $V_{ERROR}$ is sampled at a high sampling frequency provided by a sampling clock. FIG. 8 is a diagram that illustrates the high frequency sampling cycles of feedback error signal $V_{ERROR}$ in more detail. The top diagram of FIG. 8 illustrates a first sampling cycle starts at time TA, and the bottom diagram of FIG. 8 illustrates a second sampling cycle starts at $2*T_D$ after time TA. As illustrated in FIG. 8, $V_{ERROR}$ is first sampled at time TA and voltage sample $V_{TA}$ is obtained at time TA. At the same time, $V_{ERROR}$ is also compared to a threshold voltage VTH. When $V_{ERROR}$ is lower than VTH at time T3, the high frequency sampling stops. The final voltage sample before time T3 is obtained to be used as voltage sample $V_{TB}$ sampled at time TB just before time T3. Because time T3 is asynchronous from the sampling clock, voltage sample $V_{TB}$ is not obtained exactly at time T3.

As illustrated in the top diagram of FIG. 8, the time interval between each sampling is equal to $T_{OSCS}$ and the final voltage sample $V_{TB}$ in the first sampling cycle is obtained at a time period of $T_D$ before time T3. $T_D$ can be any value between zero and $T_{OSCS}$, depending on when feedback error signal $V_{ERROR}$ drops below VTH. This time period $T_D$ thus introduces an error for $V_{TB}$ as $T_D$ varies in each sampling cycle. As illustrated in the bottom diagram of FIG. 8, the second sampling cycle is delayed by a time period of $2*T_D$. As a result, the final voltage sample $V_{TB}$ in the second sampling cycle is obtained at a time period of ($T_{OSCS}-T_D$) before time T3. On average, voltage sample $V_{TB}$ is obtained at a time period of $T_{OSCS}/2$ before T3. By adjusting the starting time of each sampling cycle, voltage sample $V_{TB}$ is therefore is independent from the error introduced by $T_D$.

Going back to FIG. 5, after voltage samples $V_{T4}$, $V_{TB}$, $V_{IPT1}$ and $V_{IPT2}$ have been properly obtained, calibrated feedback error voltage $V_{CE}$ is then calculated according to Equation 5 in step 103 of FIG. 5. According to Equation 5, error function block 84 performs a piecewise linear (PWL) approximation to the feedback error signal $V_{ERROR}$ such that the calibrated feedback error voltage $V_{CE}$ is equal to a feedback error voltage when the secondary inductor current $I_{SEC}$ is equal to zero.

Figure 9:
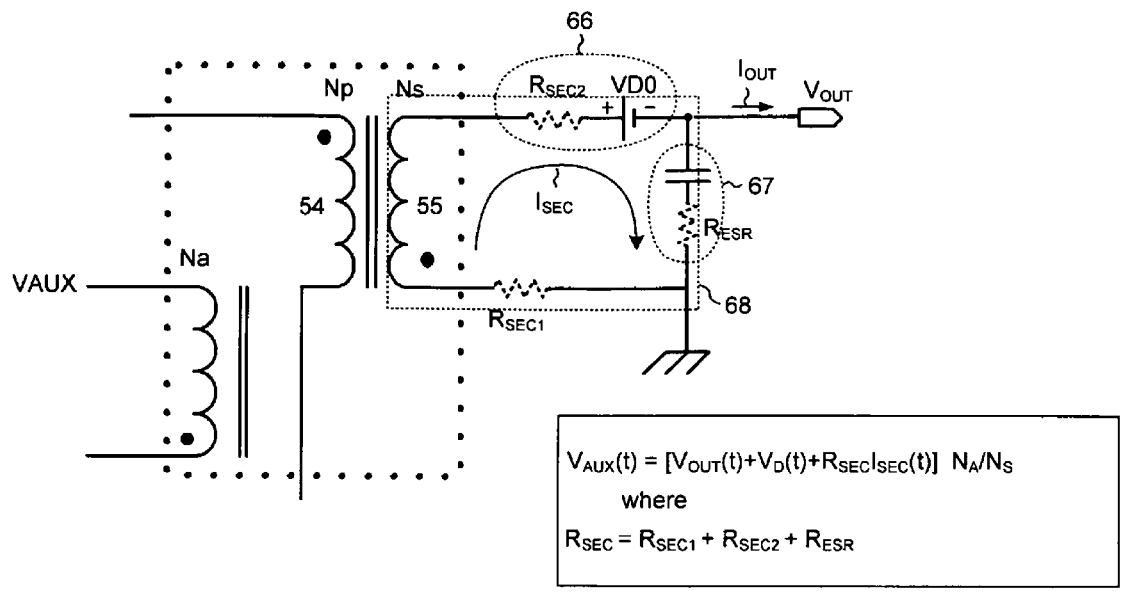
FIG. 9 is a block diagram of a secondary inductor current loop of a PSR flyback converter.

FIG. 9 is a block diagram of secondary inductor current loop 68 of PSR flyback converter 50. As illustrated in FIG. 9, secondary inductor current loop 68 includes secondary winding 55, a rectifier diode 66, and an output capacitor 67. Secondary winding 55 has an equivalent resistance of $R_{SEC1}$, rectifier diode 66 has an equivalent resistance of $R_{SEC2}$, and output capacitor 67 has an equivalent series resistance of $R_{ESR}$. As a result, the secondary inductor current loop resistance $R_{SEC}$ is approximately equal to $R_{SEC1}+R_{SEC2}+R_{ESR}$. Rectifier diode 66, however, is a nonlinear component. The nonlinearity of diode 66 needs to be compensated in order to further improve the accuracy in regulating the output voltage $V_{OUT}$ of PSR flyback converter 50.

Figure 10:
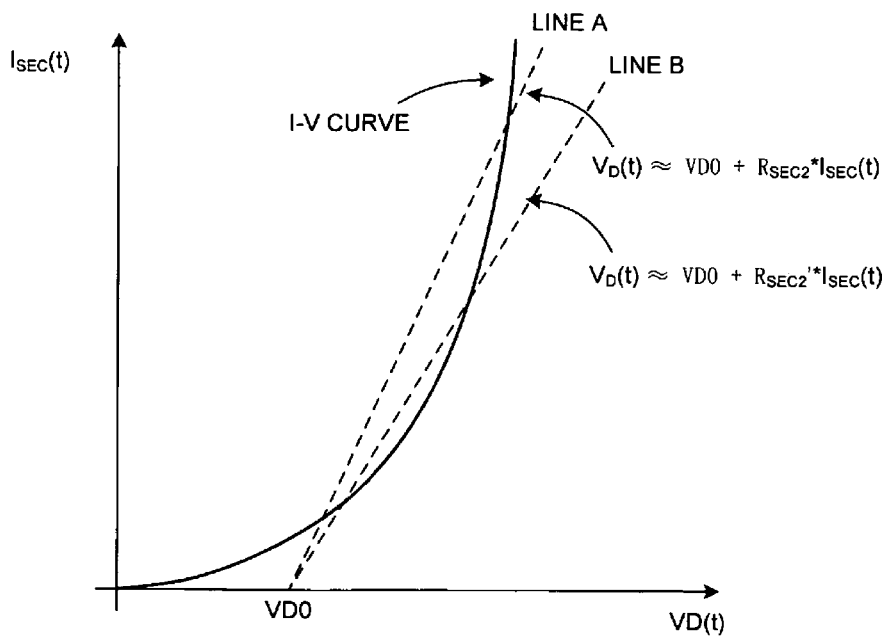
FIG. 10 is a diagram that illustrates a current-voltage characteristic of a diode.

FIG. 10 is a diagram that illustrates a current-voltage characteristic of rectifier diode 66. As illustrated in FIG. 10, the I-V curve of diode 66 is a nonlinear curve. However, such I-V curve can be approximated by a straight Line A or a straight Line B. Assuming that the voltage drop across diode 66 is equal to VD0 when $I_{SEC}$ is zero, it follows that:

$$V_D(t) \approx VD0 + R_{SEC2} \cdot I_{SEC}(t) \tag{Equ. 6}$$

or $$V_D(t) \approx VD0 + R_{SEC2}' * I_{SEC}(t) \tag{Equ. 7}$$

where $I_{SEC}$ is the secondary inductor current, $R_{SEC2}$ or $R_{SEC2}'$ is the equivalent resistance of diode 66, and $R_{SEC2}'$ is larger than $R_{SEC2}$. Equation 6 represents the Line A approximation to the I-V curve and equation 7 represents the Line B approximation to the I-V curve. In the example of FIG. 10, Equation 6 is a better approximation when $I_{SEC}$ is relatively large, and Equation 7 is a better approximation when $I_{SEC}$ is relatively small.

Because of the nonlinearity of rectifier diode 66, the piecewise linear approximation to feedback error signal $V_{ERROR}$ can be further adjusted in order to compensate for such nonlinearity. Because $R_{SEC2}$ varies according to the secondary inductor current $I_{SEC}$, the secondary inductor current loop resistance $R_{SEC}$ also varies. As a result, Equation 3 can be adjusted to be as:

$$(V_{TA}-V_{TB})/(V_{TB}-V_{CE}) = \alpha \cdot (I_{PT2}-I_{PT1})/(I_{PT1}-0) \tag{Equ. 8}$$

where $\alpha$ is a constant with a value larger than one. From Equation 8, the calibrated feedback error voltage $V_{CE}$ can be expressed as:

$$V_{CE} = V_{TB} - \alpha \cdot (V_{TA}-V_{TB})/(I_{PT2}-I_{PT1}) \cdot I_{PT1} \tag{Equ. 9}$$

or $$V_{CE} = V_{TB} - \alpha \cdot (V_{TA}-V_{TB})/(V_{IPT2}-V_{IPT1}) \cdot V_{IPT1} \tag{Equ. 10}$$

where $\alpha$ is a constant with a value larger than one. By properly adjusting the value of $\alpha$, the calibrated feedback error voltage $V_{CE}$ is calculated to compensate for the nonlinearity of rectifier diode 66 and thus further improve the accuracy in regulating the output voltage $V_{OUT}$ of PSR flyback converter 50.

Figure 11:
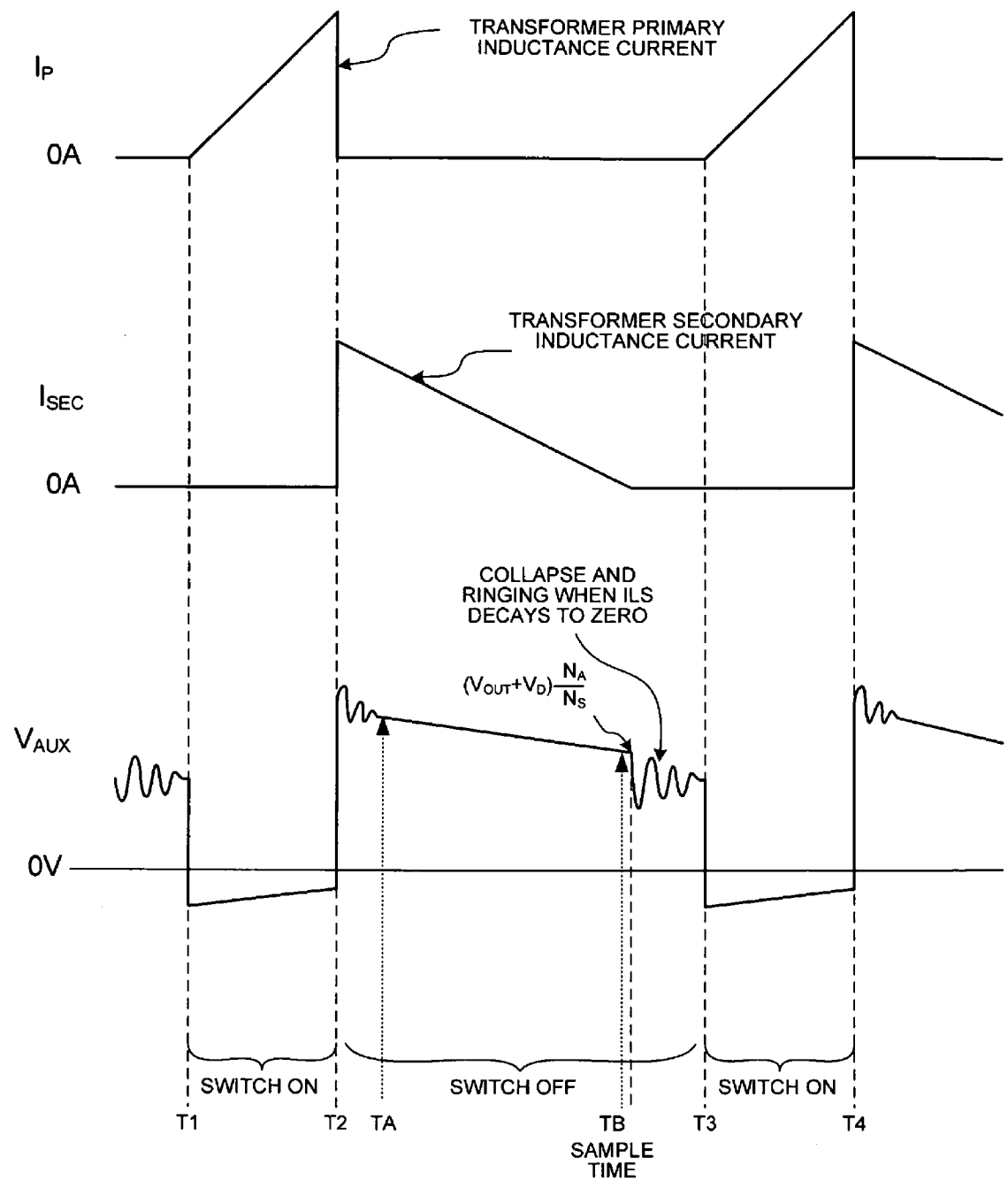
FIG. 11 is a waveform diagram of a PSR flyback converter in discontinuous conduction mode (DCM) operation.

FIG. 11 is a waveform diagram of a flyback converter in discontinuous conduction mode (DCM) operation. As illustrated in FIG. 11, the waveforms of primary inductor current $I_P$ and secondary inductor current $I_{SEC}$ are similar to the waveforms in FIG. 4. In DCM operation, however, the primary inductor current $I_P$ starts from zero at time T1, and the secondary inductor current $I_{SEC}$ decays to zero during the SWITCH OFF time from T2 to T3. As a result, the auxiliary voltage $V_{AUX}$ is simply equal to $(V_{OUT}+VD) \cdot N_4/N_S$ at time TB when $I_{SEC}$ decays to approximately zero. $V_{AUX}$ is therefore not sensitive to the secondary inductor current loop total parasitic resistance $R_{SEC}$ at time TB. The voltage sample $V_{TB}$ of the feedback error signal $V_{ERROR}$ at time TB can therefore be directly used without calibration. The calibration method expressed by Equation 4 or 5, however, is applicable in both CCM and in DCM operation. Because $I_{PT1}=0$ in DCM operation, it follows from Equation 4 or 5 that $V_{CE}=V_{TB}$, which is still correct in DCM operation. Therefore, the method of calibrating the feedback error voltage $V_{ERROR}$, although designed for CCM operation, is nevertheless suitable to be used for both CCM and DCM operation.

Although the present invention is described in connection with certain specific embodiments for instructional purposes, the present invention is not limited thereto. Flyback converter 50 can be any other type of switching voltage regulator. The secondary inductor current loop 68 can be an output inductor current loop of the switching voltage regulator. Feedback-derived signal (feedback signal) $V_{FB}$, instead of feedback-derived signal (feedback error signal) $V_{ERROR}$, can be sampled and processed without pre-amplifying. Voltage samples of feedback error signal $V_{ERROR}$ and current-sense signal $V_{CS}$ can be sampled at different times during the ON and OFF cycle. Voltage sample $V_{TB}$ can be the last sample before sampling stops for each cycle, or any of the samples before the last sample. The calibrated feedback error voltage $V_{CE}$ can be obtained based on an approximation to the feedback error signal $V_{ERROR}$ other than a piecewise linear approximation. Accordingly, various modifications, adaptations, and combinations of various features of the described embodiments can be practiced without departing from the scope of the invention as set forth in the claims.

What is claimed is:

1. A method comprising:
    (a) generating multiple original voltage samples of a feedback-derived signal by sampling the feedback-derived signal during an OFF cycle of a power switch of a power converter, wherein the feedback-derived signal is indicative of an output voltage of the power converter;
    (b) generating at least one voltage samples of a current-sense signal during an ON cycle of the power switch, wherein the current-sense signal is indicative of an output inductor current of the power converter;
    (c) generating a calibrated feedback-derived voltage based on the multiple original voltage samples of the feedback-derived signal and said at least one voltage samples of the current-sense signal; and
    (d) using the calibrated feedback-derived voltage to regulate the output voltage of the power converter.

2. The method of claim 1, wherein the power converter is a flyback converter, and wherein the output inductor current loop is a secondary inductor current loop.

3. The method of claim 1, wherein the power converter is operable in continuous conduction mode (CCM).

4. The method of claim 3, wherein the power converter transitions between CCM and discontinuous conduction mode (DCM) as operating condition changes.

5. The method of claim 1, wherein the feedback-derived signal is a feedback error signal proportional to the difference between a feedback voltage and a reference voltage.

6. The method of claim 1, wherein the calibrated feedback-derived voltage corresponds to a feedback-derived voltage when the output inductor current is approximately zero.

7. The method of claim 6, wherein the calibrated feedback-derived voltage is reduced when said at least one voltage samples of the current-sense signal increase.

8. The method of claim 7, wherein said reduction is based on an effective trans-resistance calibration factor determined by the multiple original voltage samples of the feedback-derived signal and said at least one voltage samples of the current-sense signal.

9. The method of claim 1, wherein the output inductor current loop comprises a diode.

10. The method of claim 9, wherein the calibration in (c) involves performing a piecewise linear approximation to the feedback-derived signal, and wherein the linear approximation is adjusted by a predetermined constant such that the calibrated feedback-derived voltage compensates for the non-linearity of the diode.

11. The method of claim 1, wherein the sampling in (a) starts at a first time period after the power switch enters the OFF cycle, and wherein a final feedback-derived signal voltage sample is obtained at a second time period before the power switch exits the OFF cycle.

12. The method of claim 8, wherein the sampling in (a) is repeated for each OFF cycle of the power switch, wherein the first time period is adjustable for each OFF cycle such that an average of the final feedback-derived signal voltage sample is independent from the second time period.

13. A power converter, comprising:
    a power switch;
    a feedback circuit that generates a feedback-derived signal that is indicative of an output voltage of the power converter;
    a current-sense circuit that generates a current-sense signal that is indicative of an output inductor current of the power converter; and
    a multi-sample error function circuit (MSEFC), wherein the MSEFC generates multiple original voltage samples of the feedback-derived signal during an OFF cycle of the power switch, wherein the MSEFC generates at least one voltage samples of the current-sense signal during an ON cycle of the power switch, and wherein the MSEFC generates a calibrated feedback-derived voltage that is less sensitive to an output inductor current loop resistance than the original voltage samples of the feedback-derived signal.

14. The power converter of claim 13, wherein the power converter is a flyback converter, and wherein the output inductor current loop is a secondary inductor current loop.

15. The power converter of claim 13, wherein the power converter is operable in continuous conduction mode (CCM).

16. The power converter of claim 15, wherein the power converter transitions between CCM and discontinuous conduction mode (DCM) as operating condition changes.

17. The power converter of claim 13, wherein the feedback-derived signal is a feedback error signal proportional to the difference between a feedback voltage and a reference voltage.

18. The power converter of claim 13, wherein the multi-sample error function circuit comprises:
    a sampler that outputs the multiple original voltage samples of the feedback-derived signal;
    a current-sense sampler that outputs said at least one voltage samples of the current-sense signal; and
    an error function block that receives the multiple original voltage samples of the feedback-derived signal and said at least one voltage samples of the current-sense signal and in response outputs the calibrated feedback-derived voltage.

19. The power converter of claim 18, wherein the sampler is a sample and hold circuit having a plurality of sampling capacitors and a plurality of switches, wherein each one of the plurality of switches couples a corresponding one of the plurality of sampling capacitors to the feedback-derived signal.

20. The power converter of claim 18, wherein the error function block reduces the calibrated feedback-derived signal when said current-sense signal increases.

21. The power converter of claim 13, wherein the output inductor current loop comprises a diode, and wherein the calibrated feedback-derived voltage compensates for the non-linearity of the diode.

22. The power converter of claim 21, wherein the calibrated feedback-derived voltage is obtained by performing a piecewise linear approximation to the feedback-derived signal, wherein the linear approximation is determined by the multiple original voltage samples of the feedback-derived signal and said at least one voltage samples of the current-sense signal, and wherein the linear approximation is adjusted by a predetermined constant.

23. A flyback converter comprising:
   an amplifier that amplifies a feedback voltage against a reference voltage and outputs a feedback error signal; and
   means for generating a calibrated feedback error voltage based on multiple original voltage samples of the feedback error signal, wherein the calibrated feedback error voltage is less sensitive to a secondary inductor current loop resistance than the original voltage samples of the feedback error signal, and wherein the flyback converter is operable in continuous conduction mode (CCM).

24. The flyback converter of claim 23, wherein the flyback converter transitions between CCM and discontinuous conduction mode (DCM) as operating condition changes.

25. The flyback converter of claim 23, wherein the calibrated feedback error voltage is obtained by performing a piecewise linear approximation to the feedback error signal, and wherein the calibrated feedback error voltage corresponds to a feedback error voltage when a secondary inductor current is approximately zero.

26. The flyback converter of claim 23, wherein the secondary inductor current loop comprises a diode, and wherein the calibrated feedback error voltage compensates for the non-linearilty of the diode.

* * * * *